(12) United States Patent
Luepke et al.

(10) Patent No.: US 8,863,398 B2
(45) Date of Patent: Oct. 21, 2014

(54) FEATURE-BASED COORDINATE REFERENCE

(75) Inventors: Rick A. Luepke, Fort Worth, TX (US); Matthew A. Sodergren, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 873 days.

(21) Appl. No.: 13/078,898

(22) Filed: Apr. 1, 2011

(65) Prior Publication Data

US 2012/0246904 A1    Oct. 4, 2012

(51) Int. Cl.
G01B 11/02 (2006.01)
G01B 11/00 (2006.01)
G01B 21/04 (2006.01)

(52) U.S. Cl.
CPC ........... *G01B 21/042* (2013.01); *G01B 11/002* (2013.01)
USPC ............................................ 33/644; 702/152

(58) Field of Classification Search
USPC ................. 33/1 CC, 121, 502, 574, 644, 645
See application file for complete search history.

(56) References Cited

U.S. PATENT DOCUMENTS

| | | | |
|---|---|---|---|
| 4,090,240 A | 5/1978 | Blanchard | |
| 4,167,151 A | 9/1979 | Muraoka et al. | |
| 4,558,480 A | 12/1985 | Okafuji et al. | |
| 4,617,623 A | 10/1986 | Inoue et al. | |
| 4,922,431 A | 5/1990 | Carter, II | |
| 5,184,051 A | 2/1993 | Schweiker et al. | |
| 5,265,027 A | 11/1993 | Sasaki et al. | |
| 5,297,023 A | 3/1994 | Seki et al. | |
| 5,380,978 A | 1/1995 | Pryor | |
| 5,390,128 A | 2/1995 | Ryan et al. | |
| 5,436,027 A | 7/1995 | Offer | |
| 5,552,992 A | 9/1996 | Hunter | |
| 5,748,505 A | 5/1998 | Greer | |
| 5,757,674 A * | 5/1998 | Marugame | .......... 702/152 |
| 6,909,517 B2 | 6/2005 | Coleman et al. | |

(Continued)

FOREIGN PATENT DOCUMENTS

EP       1 189 022       3/2002
WO    WO 99/56146     11/1999

OTHER PUBLICATIONS

Automated Inspection of Aircraft, U.S. Department of Transportation—Federal Aviation Administration, Apr. 1998, Office of Aviation Research, Washington, D.C., retrieved from <http://www.tc.faa.gov/its/worldpac/techrpt/ar97-69.pdf>.

(Continued)

*Primary Examiner* — G. Bradley Bennett
(74) *Attorney, Agent, or Firm* — McDermott Will & Emery LLP

(57) ABSTRACT

A method and system for creating a feature-based coordinate reference is provided. In one aspect, a system comprises a first, second, and third feature location block configured to engage a first, second, and third feature of an object, respectively. Each feature location block has a means for attachment to the object and a target placement feature. The target placement feature of each feature location block is configured to receive a respective target and guide placement of the respective target on the object. A target measuring system measures the locations of the targets on the object, and a coordinate system creates a coordinate reference based on the locations of the targets.

20 Claims, 8 Drawing Sheets

(56) References Cited

U.S. PATENT DOCUMENTS

| | | |
|---|---|---|
| 7,117,115 B2 | 10/2006 | Beignon et al. |
| 7,195,429 B2 | 3/2007 | Dods et al. |
| 7,307,737 B1 | 12/2007 | Kling, III |
| 7,467,061 B2 * | 12/2008 | Satoh et al. .................. 702/150 |
| 7,587,837 B2 | 9/2009 | David et al. |
| 7,591,078 B2 | 9/2009 | Crampton |
| 2002/0104390 A1 | 8/2002 | Jones |
| 2003/0038933 A1 | 2/2003 | Shirley |
| 2007/0291282 A1 | 12/2007 | Van Den Bossche |
| 2010/0042361 A1 * | 2/2010 | Hadley et al. ................. 702/152 |
| 2010/0138185 A1 * | 6/2010 | Kang ............................ 702/152 |
| 2010/0179786 A1 * | 7/2010 | Lee et al. ...................... 702/150 |

OTHER PUBLICATIONS

Schmitz, et al. Pre-Machining CNC Contour Validation, University of Florida—Machine Tool Research Center, Gainesville, FL, retrieved from <http://highspeedmachining.mae.ufl.edu/htmlsite/publications/dr_schmitz/paper_18.pdf>.

* cited by examiner

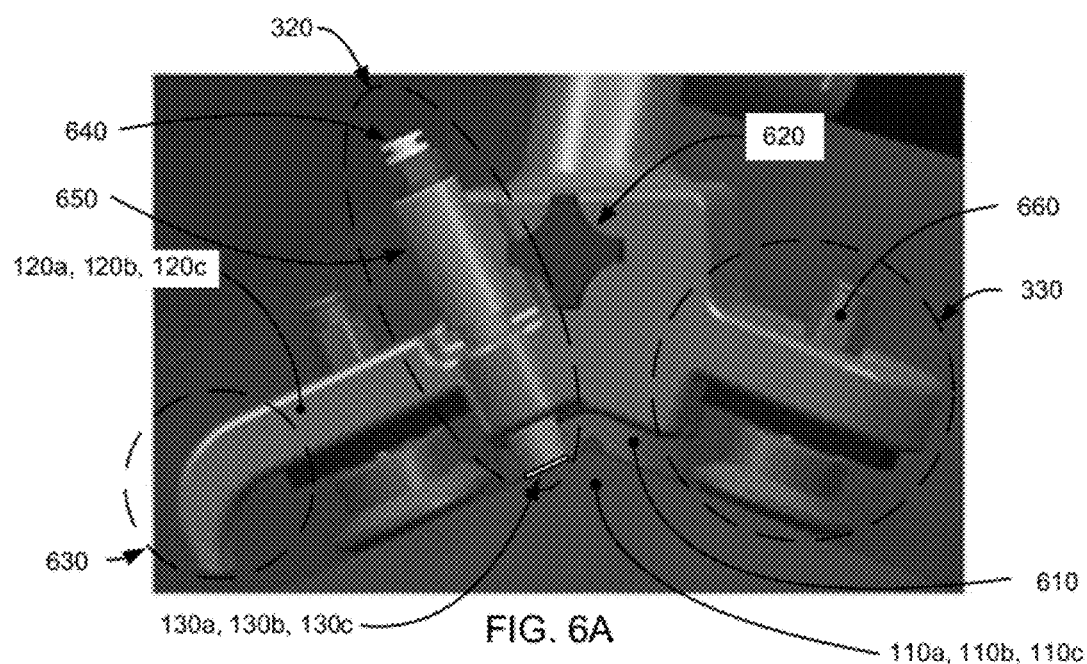
FIG. 6A
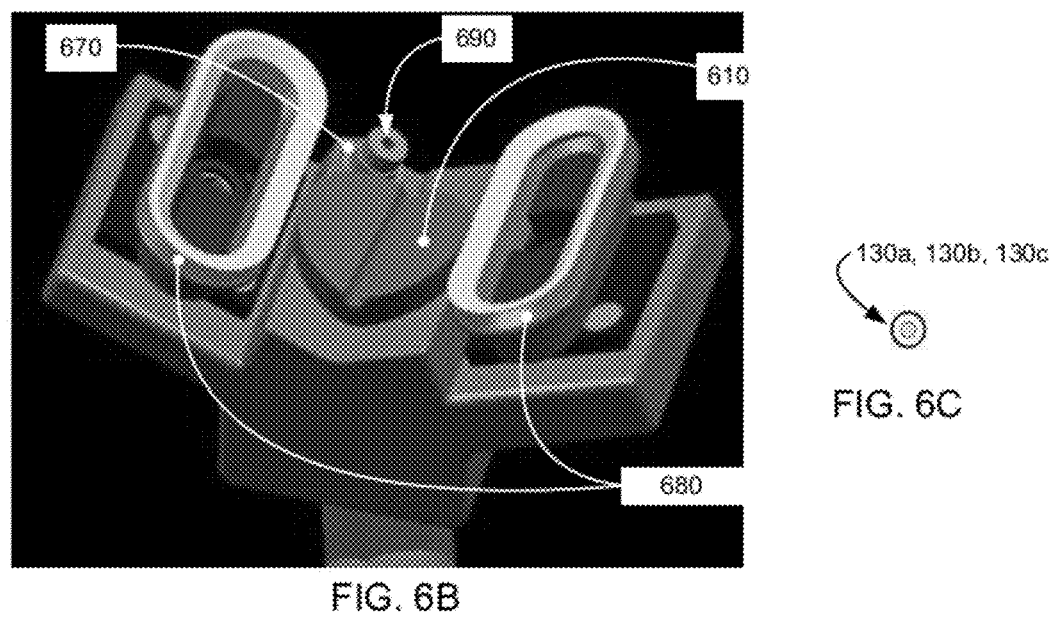
FIG. 6B
FIG. 6C

FEATURE-BASED COORDINATE REFERENCE

STATEMENT AS TO RIGHTS TO INVENTIONS MADE UNDER FEDERALLY SPONSORED RESEARCH OR DEVELOPMENT

Not Applicable.

FIELD

The present invention generally relates to creating a coordinate reference and, in particular, relates to creating a feature-based coordinate reference for automation equipment.

BACKGROUND

Certain process applications require automation equipment to accurately interface with an object. To accurately interface with the object, the automation equipment requires a coordinate reference in order to sync a Numerically Controlled program to the object. Many objects, however, do not have physical features that can be accurately measured to create the coordinate reference.

In the case of an object comprising an aircraft, Low Observable ("LO") performance coatings may be applied to the aircraft's surface after assembly of its components is complete. Automation equipment may be used to place tools against the aircraft's surface for application of the performance coatings. Certain areas of an aircraft, such as the area near an air inlet duct, require precise movement and positioning of the tools onto the aircraft's surface. However, an aircraft may not have physical features that can be accurately measured to create the coordinate reference for the automation equipment to accurately interface with the aircraft.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects of the subject technology, provide a method and system for creating a feature-based coordinate reference which may be used by automation equipment to accurately interface with an object.

According to various aspects of the subject technology, a method for creating a feature-based coordinate reference using at least a first, second, and third feature of an object is provided. The method comprises placing a first, second, and third feature location block on the first, second, and third feature of the object, respectively, and placing a first, second, and third target on the object using the first, second, and third feature location block, respectively, wherein each feature location block is configured with a target placement feature for guiding placement of the respective target on the object. The method further comprises measuring locations of the first, second, and third target, and creating a coordinate reference based on the locations of the first, second, and third target.

According to various aspects of the subject technology, a system for creating a feature-based coordinate reference on an object with at least a first, second, and third feature is provided. The system comprises a first, second, and third feature location block. The first, second, and third feature location blocks are configured to engage the first, second, and third features of the object, respectively. Each feature location block has a means for attachment to the object and a target placement feature. The target placement feature of each feature location block is configured to receive a respective target and guide placement of the respective target on the object. The system further comprises a target measuring system configured to measure the locations of the targets, and a coordinate system configured to create a coordinate reference based on the locations of the targets.

According to various aspects of the subject technology, a method for syncing automation equipment to an aircraft using at least a first, second, and third feature of the aircraft is provided. The method comprises placing a first, second, and third feature location block on the first, second, and third feature of the aircraft, respectively, and placing a first, second, and third target on the aircraft using the first, second, and third feature location block, respectively, wherein each feature location block is configured with a target placement feature for guiding placement of the respective target on the aircraft. The method further comprises measuring locations of the first, second, and third target, creating a coordinate reference based on the locations of the first, second, and third target, and syncing automation equipment to the aircraft using the coordinate reference.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIGS. 6A and 6B illustrate detail views of one of the feature location blocks and a respective feature of an object, in accordance with various aspects of the subject technology.

FIG. 6C illustrates an exemplary target, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology. Like components are labeled with identical element numbers for ease of understanding.

Various aspects of the subject technology provide a method and system for creating a feature-based coordinate reference to enable automation equipment to accurately interface with an object (e.g., an aircraft). In one aspect, a system comprises a first, second, and third feature location block configured to engage a first, second, and third feature of the object, respectively. Each feature location block has a means for attaching to the surface of the object and a target placement feature for guiding placement of a respective target onto the surface of the object. A target measuring system measures the locations of the targets on the object, and a coordinate system creates a coordinate reference based on the locations of the targets on the object. The automation equipment uses the coordinate reference to sync to the object. The automation equipment may be used, for example, to apply performance coatings onto the surface of the object.

Figure 1:
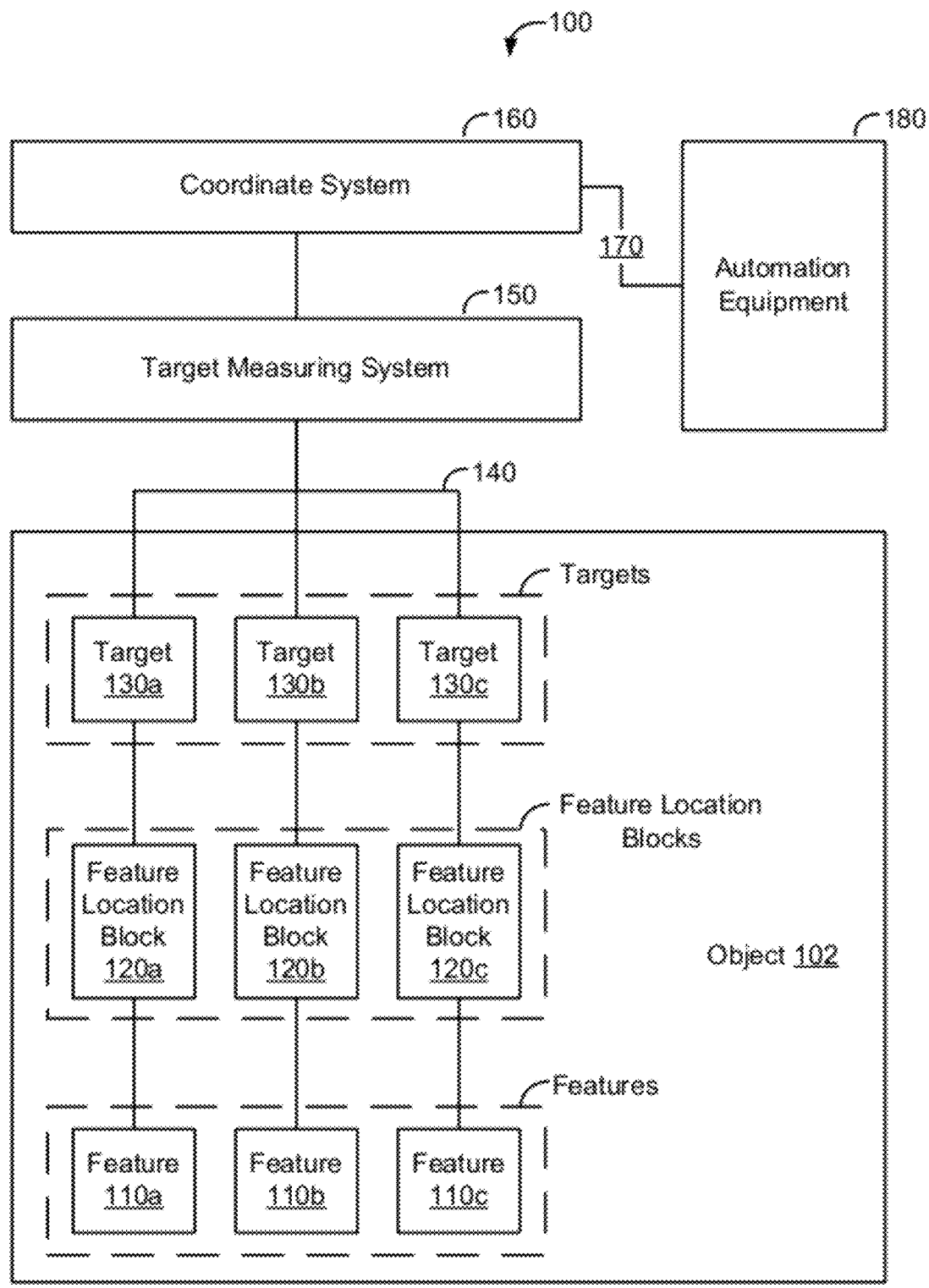
FIG. 1 is a block diagram illustrating a feature-based coordinate reference system, in accordance with various aspects of the subject technology.

FIG. 1 is a block diagram illustrating a feature-based coordinate reference system 100, in accordance with various aspects of the subject technology. The feature-based coordinate reference system 100 may be used to create a coordinate reference 170 for automation equipment 180 using at least three features 110a, 110b, and 110c of an object 102. The features may, for example, include a certain geometry, shape, or combinations thereof. Once the coordinate reference 170 is created, the coordinate reference system 100 may communicate the coordinate reference 170 to the automation equipment 180 to sync the automation equipment 180 with the object, as discussed further below.

In one aspect, the feature-based coordinate reference system 100 comprises feature location blocks 120a, 120b, and 120c, targets 130a, 130b, and 130c, a target measuring system 150, and a coordinate system 160. The feature location blocks 120a, 120b, and 120c are configured to engage the features 110a, 110b, and 110c of the object 102. The targets 130a, 130b, and 130c are configured to be placed on the object 102 using the feature location blocks 120a, 120b, and 120c, respectively. The feature location blocks 120a, 120b, and 120c guide placement of the targets 130a, 130b, and 130c onto the surface of object 102. The target measuring system 150 is configured to measure the locations 140 of the targets 130a, 130b, and 130c, and may, for example, comprise a photogrammetry system. The coordinate system 160 is configured to create a coordinate reference 170 based on the locations 140 of the targets 130a, 130b, and 130c on the object 102, and may, for example, implement a Numerically Controlled program. The automation equipment 180 uses the coordinate reference 170 to sync movement and positioning of certain tools to the object 102, and may, for example, comprise a robotic system. The automation equipment 180, for example, may be used to accurately position, within thousands of an inch, tooling on the object 102 by using the coordinate reference 170 to interface with the object 102.

In some aspects, the object 102 may not have physical features that may be accurately measured to create a coordinate reference. The object 102, however, may have features, 110a, 110b, and 110c that may be used by the feature location blocks 120a, 120b, and 120c to apply the targets 130a, 130b, and 130c onto the surface of the object 102. The features 110a, 110b, and 110c may, for example, include a certain geometry, shape, or combinations thereof. The object 102 may comprise a vehicle or aircraft.

In some aspects, the targets 130a, 130b, and 130c comprise metrology targets or other physically measurable targets. The targets 130a, 130b, and 130c may be temporarily affixed to the surface of the object 102, for example, with adhesive. The targets 130a, 130b, and 130c may comprise white circles with black shapes, which may be detected by the target measurement system 150 to measure the locations 140 of the targets, as discussed further below.

According to various aspects of the subject technology, the target measuring system 150 comprises a vision system, such as a White Light Scanner system, for measuring the locations 140 of the targets 130a, 130b, and 130c. The White Light Scanner system uses non-contact sensors, such as cameras, to measure the physical geometrical characteristics of the targets 130a, 130b, and 130c, including the locations 140 of the targets 130a, 130b, and 130c. The White Light Scanner system may do this by detecting the white circles and black shapes on the targets 130a, 130b, and 130c.

According to various aspects of the subject technology, the coordinate system 160 performs a Numerical Control Program Transformation, commonly referred to as a 3-2-1 Transformation, that creates the coordinate reference 170 for the automation equipment 180 to align to the object 102. The coordinate reference 170 is based on the locations 140 of the targets 130a, 130b, and 130c measured by the target measuring system 150. The Numerical Control Program Transformation uses the location 140 of the target 130a to define a first point, the location 140 of the target 130b to define a second point, and the location 140 of the target 130c to define a third point in three dimensional space. The first, second, and third points are then used to define the coordinate reference 170. Although three targets are used to create the coordinate reference 170 in this example, additional targets may be used to create the coordinate reference 170.

According to various aspects of the subject technology, the coordinate system 160 creates the coordinate reference 170 using a model of the object 102 to transform the locations 140 of the targets 130a, 130b, and 130c to respective points in the model. The model may be stored in memory in the coordinate system 160.

According to various aspects of the subject technology, the coordinate system 160 creates the coordinate reference 170, which the automation equipment 180 may use to accurately position a tool against the surface of the object 102 within a very close positional tolerance and without interfering with the object 102 or components thereof.

In some aspects of the subject technology, the automation equipment 180 may use the coordinate reference 170 to sync a Numerical Control program to the object 102. The automation equipment 180 may comprise a robotic system configured for accurate movement of a tool along a programmed path and for accurate positioning of the tool on the surface of the object 102. For example, the automation equipment 180 may comprise a robotic system used to accurately position an injection tool against the surface of an aircraft. In this example, the automation equipment 180 may use the coordinate reference 170 to accurately move the injection tool along a programmed path without colliding against certain components of the aircraft, such as an air inlet duct. Thus, the coordinate reference 170 enables the automation equipment 180 to determine the relative location of critical features on the aircraft and move along a programmed path. The injection tool may be used to perform a mold-in-place process. In this process the injection tool is positioned against the surface of the aircraft using the coordinate reference 170, and a mold cavity is created between the inside surface of the injection tool and the outer surface of the aircraft. Low Observable performance coatings may then be injected into the mold cavity and allowed to cure, adhesively bonding the coating onto the aircraft's surface. The injection tool, once removed, leaves the bonded Low-Observable material in place.

Figure 2:
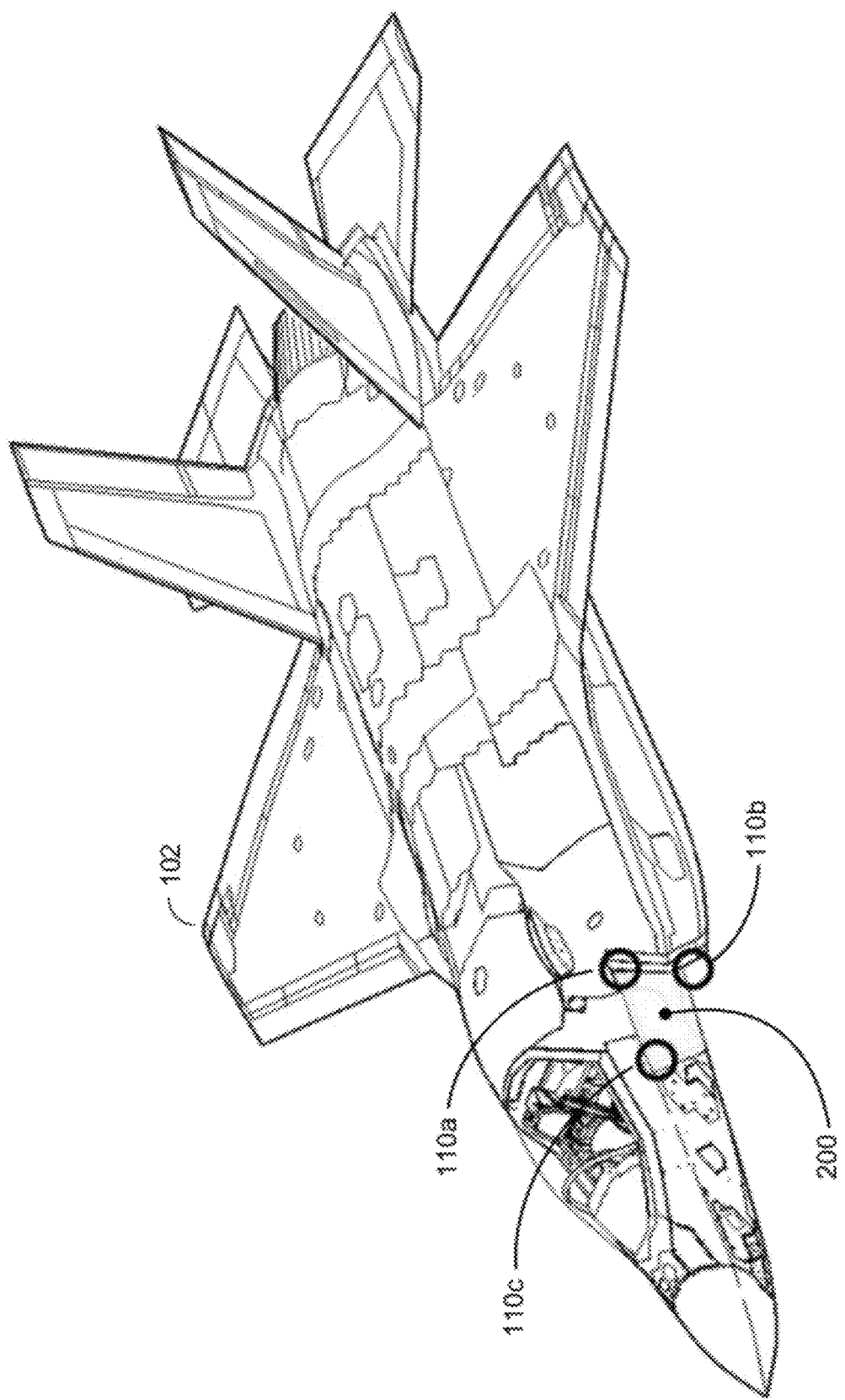
FIG. 2 illustrates an exemplary object comprising an aircraft, in accordance with various aspects of the subject technology.

FIG. 2 illustrates an exemplary object 102 comprising an aircraft, in accordance with various aspects of the subject technology. The object 102 further comprises three features 110*a*, 110*b*, and 110*c*, and air inlet duct area 200. The feature 110*a* comprises aspects of the geometric shape of the aircraft's side-body chine and upper air inlet duct. The feature 110*b* comprises aspects of the geometric shape of the aircraft's lower air inlet duct. The feature 110*c* comprises aspects of the geometric shape of the aircraft's side-body chine. In this example, the features 110*a*, 110*b*, and 110*c* lack physical features which can be accurately measured, but comprise features which can be physically located on the aircraft. The air inlet duct area 200 is known as a compression bump that controls the compression of air into the air inlet duct. The air inlet duct area 200 is a critical area because it is visible to radar and thus requires application of Low-Observable material to the air inlet duct area 200.

Figure 3:
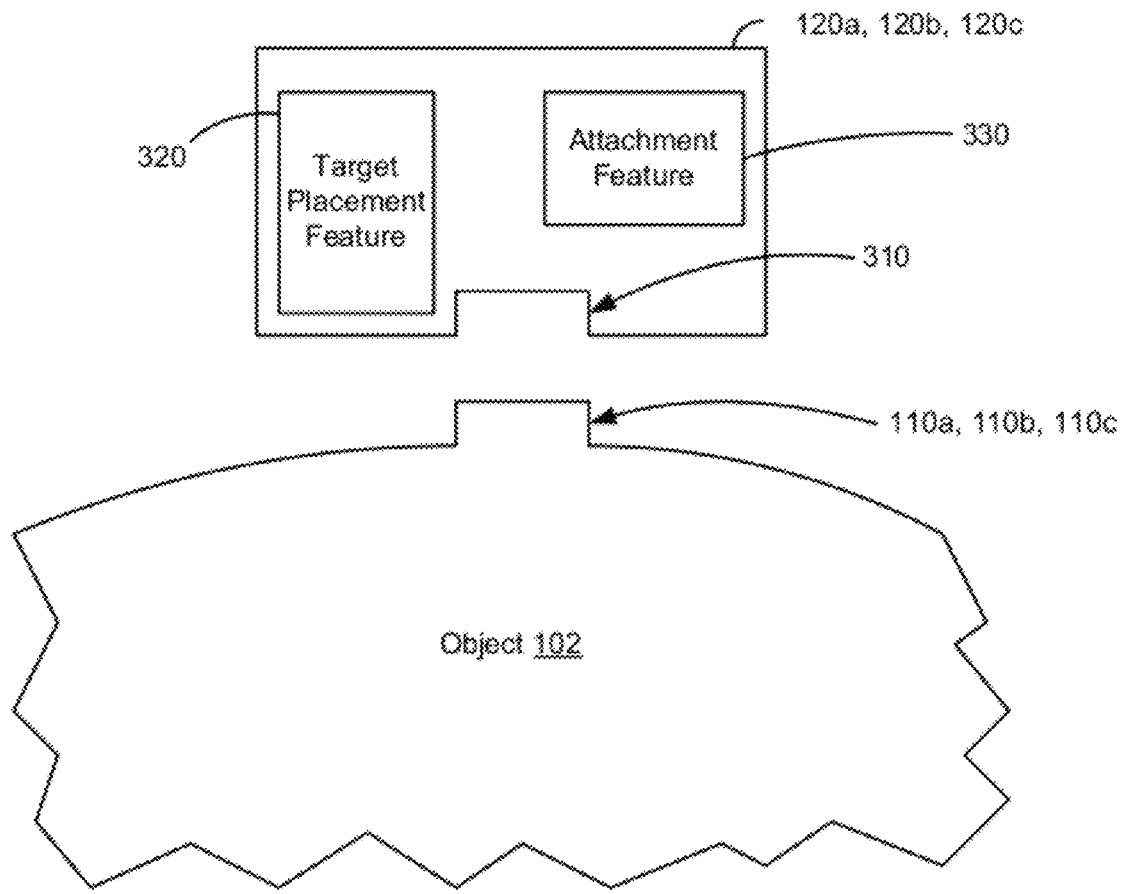
FIG. 3 is a simplified diagram illustrating one of the feature location blocks and an object, in accordance with various aspects of the subject technology.

FIG. 3 is a simplified diagram illustrating one of the feature location blocks 120*a*, 120*b*, and 120*c* and an object 102, in accordance with various aspects of the subject technology. Each feature location block 120*a*, 120*b*, and 120*c* comprises a target placement feature 320, attachment feature 330, and a feature engagement 310. The attachment feature 330 is configured to temporarily hold the feature location block 120*a*, 120*b*, and 120*c* against the surface of the object 102. The feature engagement 310 is configured to engage a respective feature 110*a*, 110*b*, and 110*c* of the object 102. According to certain aspects, the target placement feature 320 is configured to receive a respective target 130*a*, 130*b*, and 130*c* and guide placement of the respective target onto the surface of the object 102. In some aspects, the target placement feature 320 places the respective target 130*a*, 130*b*, and 130*c* at a predetermined relative location with respect to the respective feature 110*a*, 110*b*, and 110*c*. According to certain aspects, the attachment feature 330 may comprise a vacuum bay configured to hold the feature location block 120*a*, 120*b*, and 120*c* against the surface of the object 102 with a vacuum.

Figure 4:
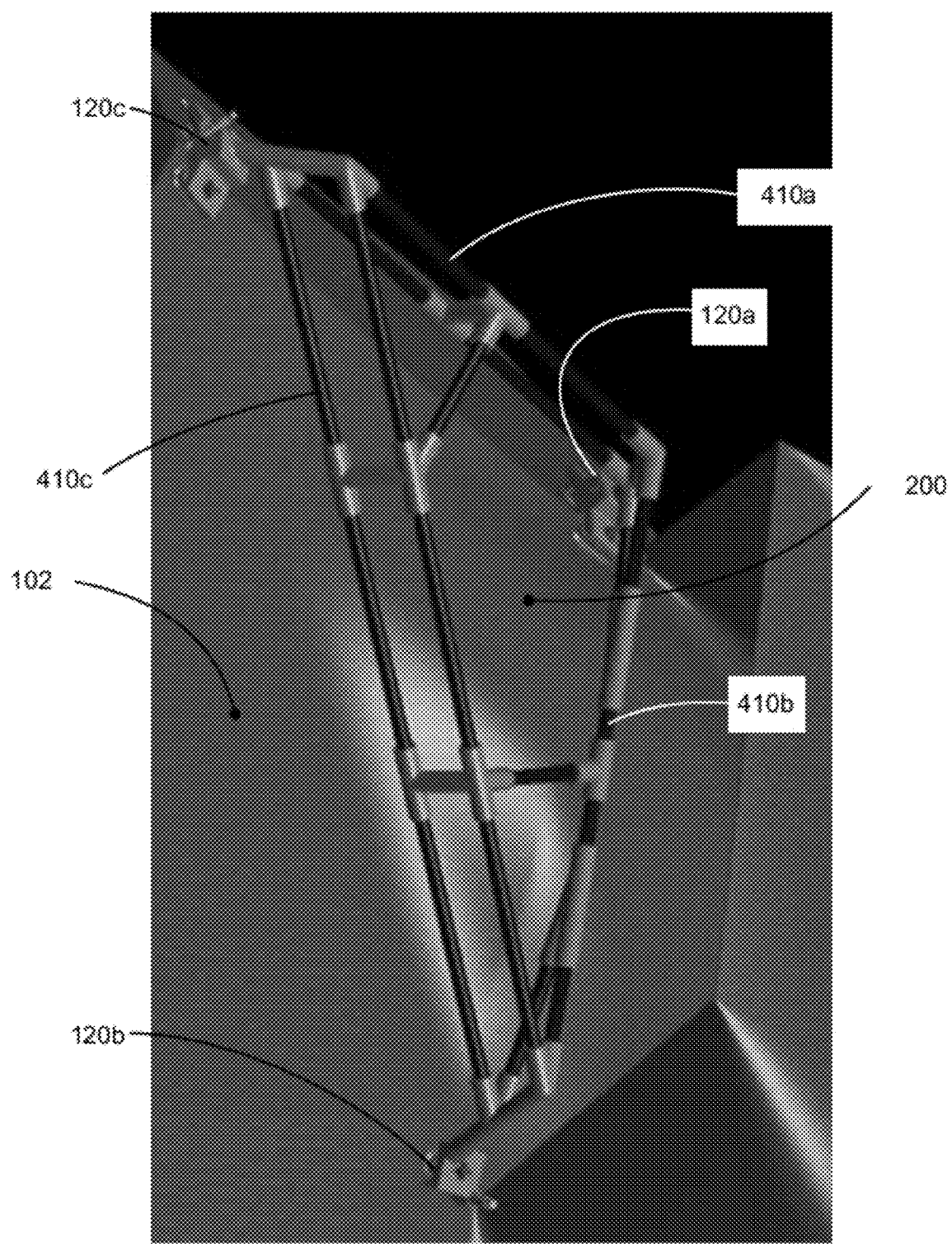
FIG. 4 is a perspective view of a plurality of feature location blocks connected to elongated members, in accordance with various aspects of the subject technology.

FIG. 4 is a perspective view of a plurality of feature location blocks 120*a*, 120*b*, and 120*c* connected to elongated members 410*a*, 410*b*, and 410*c*, in accordance with various aspects of the subject technology. The feature location blocks 120*a*, 120*b*, and 120*c* may be configured to be components of an assembly, connected to each other using a plurality of elongated members 410*a*, 410*b*, and 410*c* such that the elongated members form a triangular shaped structure. For example, the feature location block 120*a* may be attached to elongated members 410*a* and 410*b*. The feature location block 120*b* may be attached to elongated members 410*b* and 410*c*. The feature location block 120*c* may be attached to elongated members 410*a* and 410*c*. In this example, by orientating and placing the feature location block 120*a* onto the feature 110*a* of the object 102, the other feature location blocks 120*b* and 120*c* are proximately orientated onto their respective features 110*b* and 110*c* by the elongated members 410*a*, 410*b*, and 410*c*. The triangular shaped structure thereby facilitates consistent orientation of each feature location block relative to the features of the object 102.

According to certain aspects, at least one of the attachments of the feature location blocks 120*a*, 120*b*, and 120*c* to the elongated members 410*a*, 410*b*, and 410*c* is configured to accommodate spatial variation of the features 110*a*, 110*b*, and 110*c* of the object 102, as may be found in multiple objects 102. For example, the feature location blocks 120*a*, 120*b*, and 120*c* may be configured to rotate relative to the elongated members 410*a*, 410*b*, and 410*c*. In some aspects, at least one of the elongated members 410*a*, 410*b*, and 410*c* may be configured for linear adjustment along the longitudinal axis of the elongated member 410*a*, 410*b*, and 410*c* to further accommodate spatial variation of the features 110*a*, 110*b*, and 110*c* of the object 102. For example, at least one of the elongated members 410*a*, 410*b*, and 410*c* may comprise an inner and outer tube, concentrically arranged and spring loaded, such that the length of the elongated member may be linearly adjusted by sliding the tubes relative to each other.

Figure 5A:
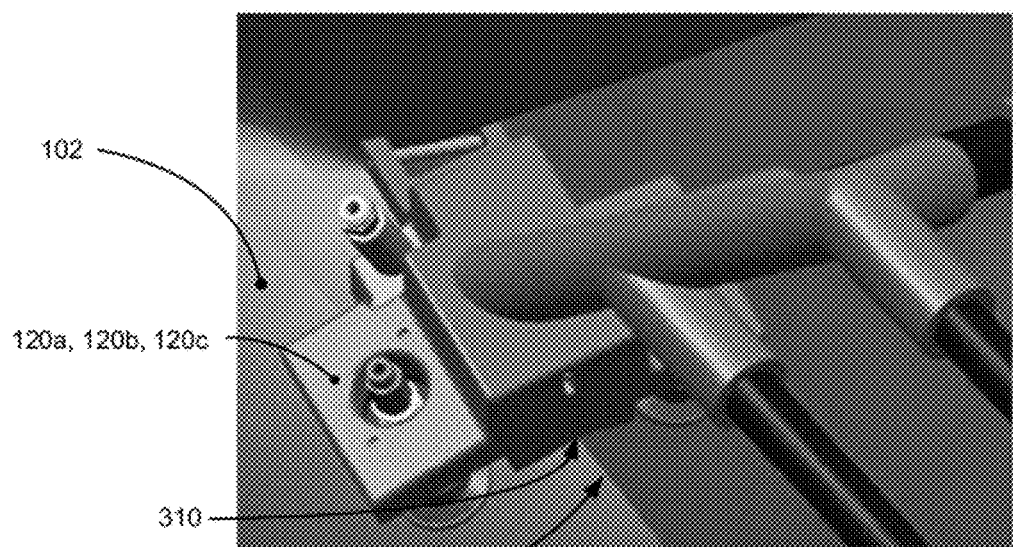
FIGS. 5A and 5B illustrate detail views of one of the feature location blocks, in accordance with various aspects of the subject technology.
Figure 5B:
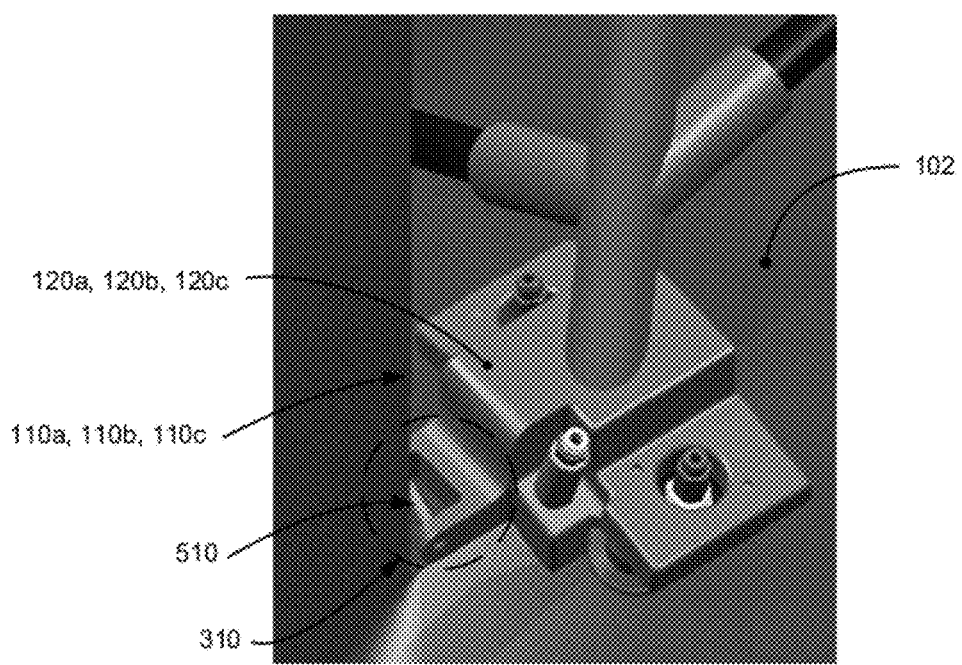

FIGS. 5A and 5B illustrate detail views of one of the feature location blocks 120*a*, 120*b*, and 120*c*, in accordance with various aspects of the subject technology. In some aspects, the feature location blocks 120*a*, 120*b*, and 120*c* may be manufactured using a stereolithography or fused deposition modeling process. In other aspects, the feature location blocks 120*a*, 120*b*, and 120*c* may be manufactured of aluminum or other suitable material that is sufficiently rigid to be attached to the object 102. Referring to FIG. 5A, according to various aspects, the feature engagement 310 of each feature location block may be contoured to the geometric shape of respective feature 110*a*, 110*b*, or 110*c* on the object 102 so that the feature engagement 310 fits onto the shape of feature 110*a*, 110*b*, or 110*c*. Referring to FIG. 5B, in some aspects, the feature engagement 310 may comprise a locator pin 510 configured to engage aspects of the respective feature 110*a*, 110*b*, or 110*c*.

FIGS. 6A and 6B illustrate detail views of one of the feature location blocks 120*a*, 120*b*, and 120*c*, and a respective feature 110*a*, 110*b*, and 110*c* of an object 102, in accordance with various aspects of the subject technology. In some aspects, feature engagement 310 may comprise a spring loaded locator pad 610 configured to engage the respective feature 110*a*, 110*b*, or 110*c* such that feature locator pad 610 fits against the specific shape of respective feature 110*a*, 110*b*, and 110*c*, without interference from other components, such as a vacuum cup 680. The spring loaded locator pad 610 may be restrained in a fully depressed position by tightening the rotating knob 620.

Referring to FIGS. 6A and 6B, the attachment feature 330 may comprise a vacuum cup 680 that is configured with a vacuum port 660 to facilitate connection to a vacuum hose. A vacuum may be created between the vacuum cup 680 and surface of the object 102 by connecting the vacuum hose to the vacuum port 660. The vacuum may be activated to temporarily hold the feature location block 120*a*, 120*b*, or 120*c* onto the surface of the object 102. After the respective target 130*a*, 130*b*, or 130*c* is placed on the object 102, the vacuum may be deactivated to detach the feature location block 120*a*, 120*b*, or 120*c* from the surface of the object 102 and allow the respective target 130*a*, 130*b*, and 130*c* to remain on the object 102.

Referring to FIGS. 6A and 6B, the target placement feature 320 may comprise a bushing 670 with a round bore that is configured to receive a target locating pin 650 with a distal end, a proximal end, and a lumen extending from the distal end to the proximal end. A vacuum fitting 640 is attached to the proximal end of the target locating pin 650. The distal end 690 of the target locating pin 650 is adapted to receive a target. A vacuum hose is connected to the vacuum fitting 640 of the target locating pin 650 thereby creating a suction force through the target locator pin 650 and distal end 690. The target 130a, 130b, or 130c is placed onto the distal end 690 of the target locator pin 650 and held in place by the suction force. The suction force thereby allows the target 130a, 130b, or 130c to be securely positioned and guided through the bushing 670 of the feature location block 120a, 120b, and 120c, and placed onto the surface of the object 102. Referring to FIG. 6C, in one aspect, each target 130a, 130b, and 130c comprises a thin, circular shaped, adhesively backed, metrology target with an outer diameter smaller than the outer diameter of the target locating pin 650. In this aspect, each target is placed on the distal end 690 of the respective target locating pin 650 with the adhesive backing facing the object 102. The target 130a, 130b, and 130c is affixed to the surface of the object 102 with the adhesive. After the target 130a, 130b, and 130c is placed and affixed onto the surface of the object 102, the vacuum hose is disconnected from the vacuum fitting 640 of the target locating pin 650, thereby terminating the suction force and allowing the target 130a, 130b, or 130c to remain on the surface of the object 102 as the target locator pin 650 is removed from the bushing 670.

In some aspects, a feature location block 120a, 120b, and 120c may be configured with an extended flange 630 such that the feature location block 120a, 120b, and 120c may rest on the extended flange 630 rather than on the vacuum cup 680 when not in use, thereby protecting the vacuum cup 680 from damage caused by inadvertent contact with certain elements or chemicals which may reside in the surrounding environment.

A method for creating a feature-based coordinate reference, in accordance with various aspects of the subject technology, will now be discussed with reference to FIGS. 1-6C.

To begin, the first, second, and third feature location blocks 120a, 120b, and 120c are placed on the first, second, and third features 110a, 110b, and 110c of the object 102, respectively. For the example of the aircraft 102 in FIG. 2, the first feature 110a of the aircraft 102 comprises aspects of the geometric shape of the aircraft's side-body chine and upper air inlet duct. The second feature 110b of the aircraft 102 comprises aspects of the geometric shape of the aircraft's lower air inlet duct. The third feature 110c of the aircraft 102 comprises aspects of the geometric shape of the aircraft's side-body chine. In this example, the first feature location block 120a is contoured to the geometric shape of the aircraft's side-body chine and further comprises a locator pin 510 to contact the upper air inlet duct. The second feature location block 120b is contoured to the geometric shape of the aircraft's body and lower air inlet duct. The third feature location block 120c is contoured to the geometric shape of the aircraft's side-body chine. The first, second, and third feature location blocks 120a, 120b, and 120c may be connected to each other to enable consistent orientation of each feature location block relative to the features of the aircraft 102. For example, in FIG. 4, the first, second, and third feature location blocks 120a, 120b, and 120c may be connected to each other using tubular members 410a, 410b, and 410c to form a triangular shaped structure. The feature location blocks 120a, 120b, and 120c may be finely adjusted within the triangular shaped structure such that the feature location blocks 120a, 120b, and 120c fit snugly against their respective features 110a, 110b, and 110c of the aircraft 102. For example, fine adjustment may be accomplished by allowing each feature location block 120a, 120b, and 120c to slightly rotate relative to one or both of the tubular members to which it is connected. Further adjustment may be accomplished by linearly adjusting at least one of the tubular members 410a, 410b, and 410c along its longitudinal axis. By allowing the orientation of the feature location blocks 120a, 120b, and 120c to be adjusted within the triangular shaped structure and the lengths of the tubular members 410a, 410b, or 410c to be adjusted, the triangular shaped structure is able to accommodate spatial variation of the features 110a, 110b, and 110c in multiple aircrafts 102.

In placing the first, second, and third feature location blocks 120a, 120b, and 120c onto the first, second, and third features 110a, 110b, and 110c of the aircraft 102 shown in FIG. 2, the triangular shaped structure is first positioned onto the surface of the aircraft such that the first and third feature location blocks 120a and 120c are positioned onto the aircraft's side-body chine, shown in FIG. 4. The triangular shaped structure is then moved in the aft direction, along the side-body chine, until the locator pin 510 of the first feature location block 120a makes contact with the upper air inlet duct, shown in FIGS. 5A and 5B. The triangular structure is then further positioned such that the second feature location block 120b makes contact with the lower air inlet duct, shown in FIG. 4. Once the triangular shaped structure is in position, it may be held onto the surface of the aircraft 102 with a vacuum force between the feature location blocks 120a, 120b, and 120c and the surface of the aircraft 102. For example, in FIGS. 6A and 6B, the first, second, and third feature location blocks 120a, 120b, and 120c are configured with vacuum bays to attach vacuum cups 680 thereto. The vacuum cups 680 are configured with a vacuum port 660 for receiving a vacuum hose. Once in position, the triangular shaped structure is held onto the surface of the aircraft 102 by connecting a vacuum hose to the vacuum port 660 of each of the first, second, and third feature location blocks 120a, 120b, and 120c thereby creating a vacuum force between the vacuum cup 680 of each feature location block and the surface of the aircraft 102.

After the feature location blocks 120a, 120b, and 120c are in place on the aircraft 102, the first, second, and third targets 130a, 130b, and 130c are placed on the aircraft 102 using the first, second, and third feature location blocks 120a, 120b, and 120c, respectively. For each target 130a, 130b, and 130c, the target placement feature 320 of the respective feature location block 120a, 120b, and 120c is configured to receive the target and guide placement of the target onto the surface of the aircraft 102, shown in FIGS. 6A and 6B. The first, second, and third targets 130a, 130b, and 130c may comprise adhesively-backed metrology targets with white circles and black shapes, shown in FIG. 6C. Each target placement feature 320 may comprise a bushing 670 with a round bore, located on the respective feature location block, that is configured to receive a target locating pin 650 with a distal end 690, a proximal end, and a lumen extending from the distal end 690 to the proximal end. The proximal end of the target locating pin 650 is adapted for a vacuum fitting 640 and the distal end 690 of the target locating pin 650 is adapted to receive the respective target thereon.

In one aspect, each target may be placed on the object 102 by connecting a vacuum hose to the vacuum fitting 660 of the respective target locating pin 650 thereby creating a suction force through the target locator pin 650 and distal end 690, shown in FIGS. 6A and 6B. The target 130a is placed on the distal end 690 of the respective target locator pin 650 and held in place by the suction force. The suction force allows the target 130a to be securely positioned and guided through the bushing 670 of the first feature location block 120a and placed onto the surface of the aircraft 102. The target 130a is secured to the surface of the aircraft 102 by its adhesively-backed surface. After the target 130a is placed and affixed onto the surface of the aircraft 102, the vacuum hose is disconnected from the vacuum fitting 660 of the target locating pin 650, thereby terminating the suction force, and allowing the target 130a to remain on the surface of the aircraft 102 as the target locator pin 650 is removed from the bushing 670 of the respective feature location block 120a.

After the targets 130a, 130b, and 130c are in place on the aircraft 102, the locations 140 of the first, second, and third targets 130a, 130b, and 130c are measured using the target measuring system 150. For example, the target measuring system 150 may comprise a photogrammetry system, such as a White Light Scanner system, to measure the locations 140 of the first, second, and third targets 130a, 130b, and 130c. The White Light Scanner system uses non-contact sensors, such as cameras, to detect the white circles and black shapes of the first, second, and third targets 130a, 130b, and 130c and measure the physical geometrical characteristics of the first, second, and third targets 130a, 130b, and 130c, including the locations 140 of the first, second, and third targets 130a, 130b, and 130c.

After the locations 140 of the targets 130a, 130b, and 130c are measured, the coordinate system 160 generates a coordinate reference 170 based on the locations 140 of the first, second, and third targets 130a, 130b, and 130c. For example, the coordinate system 160 may perform a Numerical Control Program Transformation to create a coordinate reference 170 based on the locations 140 of the first, second, and third targets 130a, 130b, and 130c measured by the target measuring system 150. The Numerical Control Program Transformation uses the location 140 of the first target 130a to define a first point, the location 140 of the second target 130b to define a second point, and the location 140 of the third target 130c to define a third point in three dimensional space. The first, second, and third points are then used to define the coordinate reference 170.

After the coordinate reference 170 is created, the coordinate reference 170 may be used to sync automation equipment 180 to the aircraft 102. In this example, the automation equipment 180 may comprise a robotic system. The robotic system 180 may use the coordinate reference 170 to sync a Numerical Control program to the aircraft 102, thereby enabling the robotic system 180 to accurately move an injection tool along a programmed path, without colliding against certain components of the aircraft 102 such as an air inlet duct. The robotic system 180 may accurately position the injection tool on the surface of the aircraft 102, within thousands of an inch, to perform a mold-in-place process. The air inlet duct area 200 is visible to radar and thus requires application of a Low Observable performance coating, shown in FIG. 2. In the mold-in-place process, a mold cavity is created between the inside surface of the injection tool and the outer surface of the aircraft 102. Low Observable performance coatings may then be injected into the mold cavity and allowed to cure, adhesively bonding the performance coating onto the aircraft's surface. The injection tool, once removed, leaves the bonded Low-Observable material in place.

Figure 7:
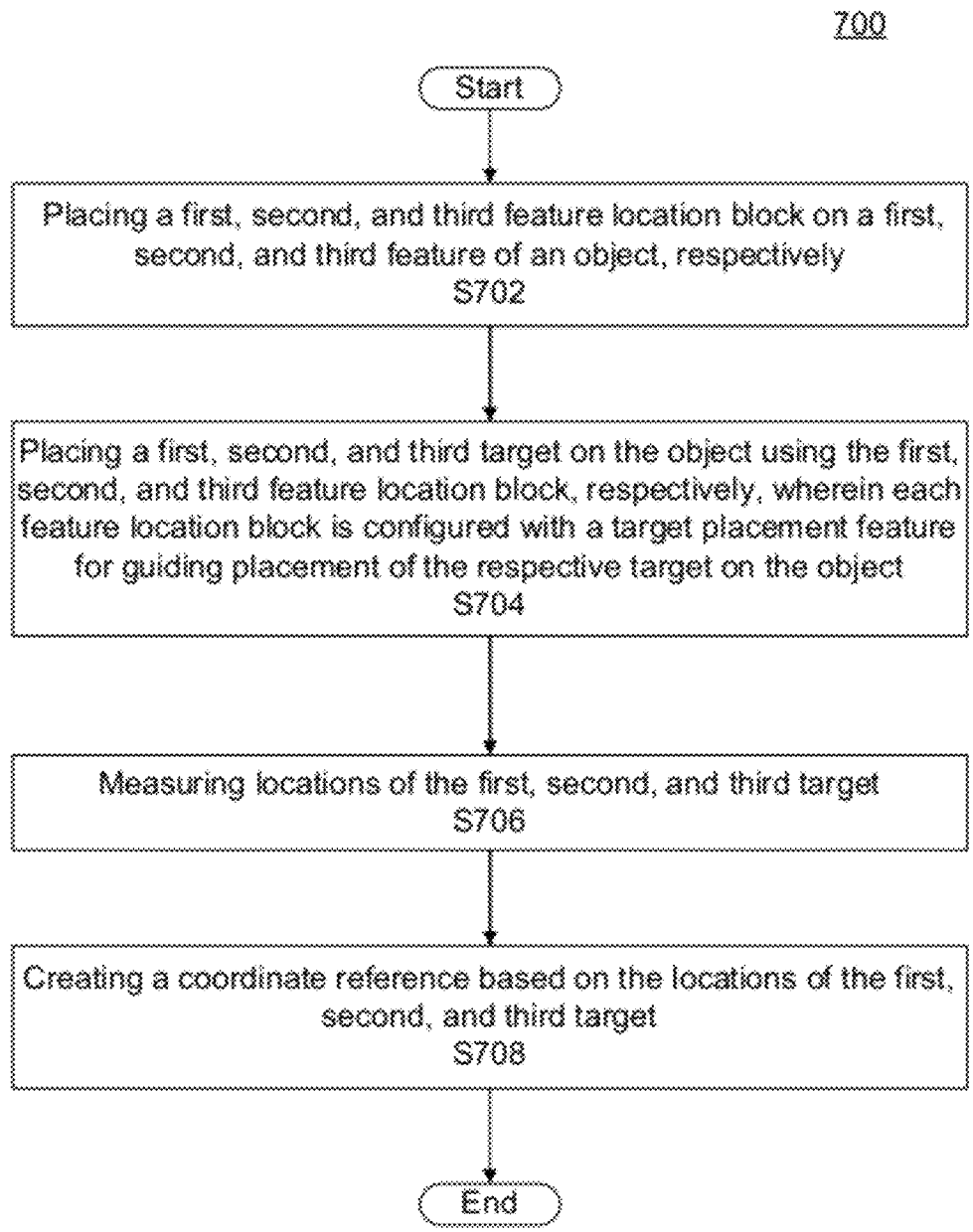
FIG. 7 illustrates an example of a method for creating a feature-based coordinate reference, in accordance with various aspects of the subject technology.

FIG. 7 illustrates an example of a method 700 for creating a feature-based coordinate reference, in accordance with various aspects of the subject technology. Method 700 comprises placing a first, second, and third feature location block on a first, second, and third feature of an object, respectively (S702), and placing a first, second, and third target on the object using the first, second, and third feature location block, respectively, wherein each feature location block is configured with a target placement feature for guiding placement of the respective target on the object (S704). The method 700 further comprises measuring locations of the first, second, and third target (S706), and creating a coordinate reference based on the locations of the first, second, and third target (S708).

Figure 8:
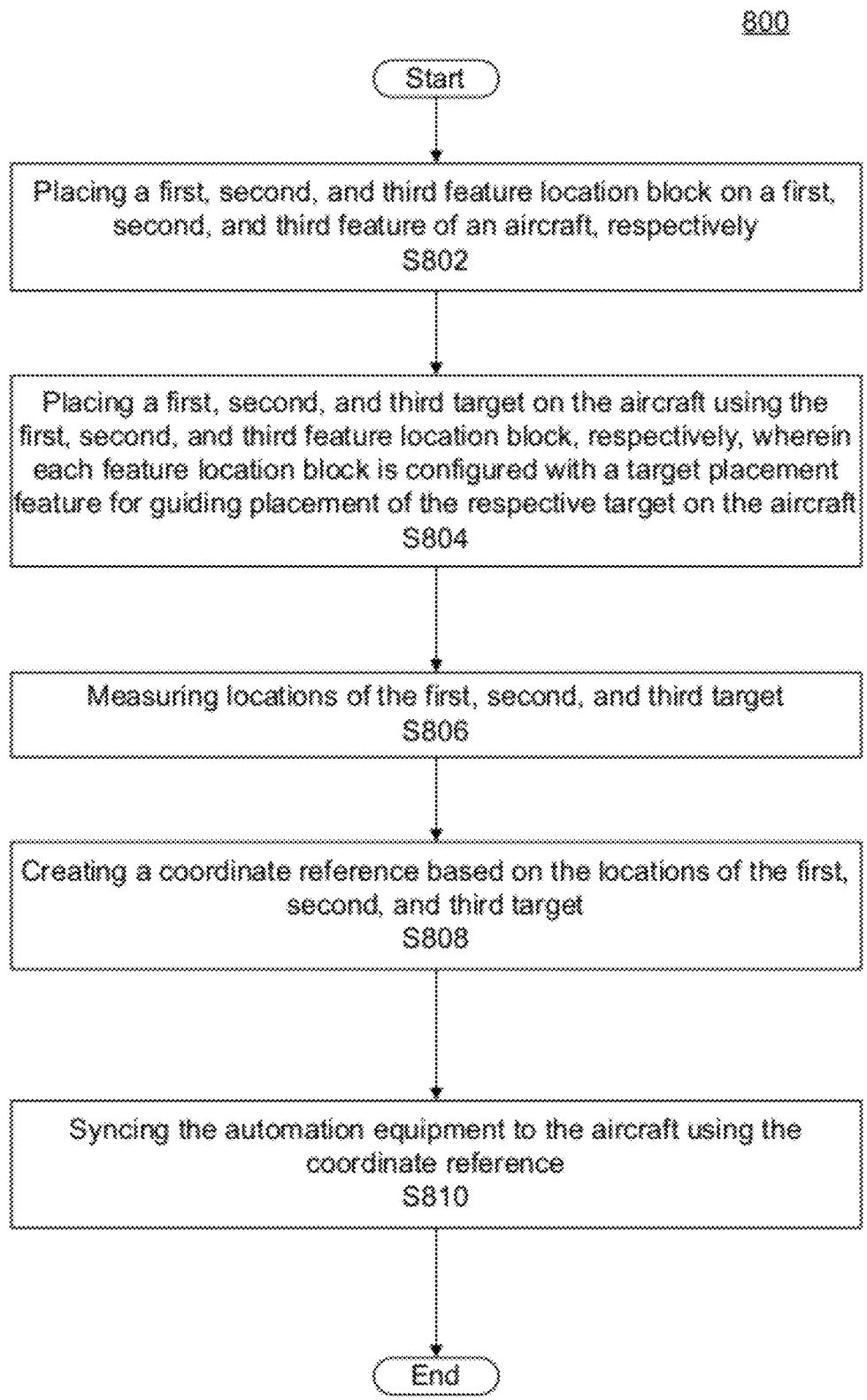
FIG. 8. illustrates an example of a method for syncing automation equipment to an aircraft, in accordance with various aspects of the subject technology.

FIG. 8. illustrates an example of a method for syncing automation equipment to an aircraft, in accordance with various aspects of the subject technology. Method 800 comprises placing a first, second, and third feature location block on a first, second, and third feature of the aircraft, respectively (S802), and placing a first, second, and third target on the aircraft using the first, second, and third feature location block, respectively, wherein each feature location block is configured with a target placement feature for guiding placement of the respective target on the aircraft (S804). The method 800 further comprises measuring locations of the first, second, and third target (S806), creating a coordinate reference based on the locations of the first, second, and third target (S808), and syncing automation equipment to the aircraft using the coordinate reference (S810).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for creating a feature-based coordinate reference using at least a first, second, and third feature of an object, the method comprising:
    placing a first, second, and third feature location block on the first, second, and third feature of the object, respectively;
    placing a first, second, and third target on the object using the first, second, and third feature location block, respectively, wherein each feature location block is configured with a target placement feature for guiding placement of the respective target on the object;
    measuring locations of the first, second, and third target; and
    creating a coordinate reference based on the locations of the first, second, and third target.

2. The method of claim 1, wherein the first feature location block is configured to engage the first feature of the object.

3. The method of claim 1, wherein each target placement feature comprises a bushing.

4. The method of claim 1, wherein at least one of the targets comprises a metrology target.

5. The method of claim 1, further comprising holding the first feature location block on the first feature of the object with a vacuum.

6. The method of claim 5, further comprising removing the first feature location block from the object by deactivating the vacuum after the respective target is placed on the object.

7. The method of claim 1, further comprising an elongated member with a first end and a second end, the first end connected to the first feature location block and the second end connected to the second feature location block.

8. The method of claim 7, wherein the first feature location block is rotatable with respect to the elongated member.

9. The method of claim 7, wherein the elongated member is configured to be adjustable in length along its longitudinal axis.

10. The method of claim 7, wherein the elongated member comprises a fixed length.

11. The method of claim 1, further comprising connecting the first, second, and third feature location blocks to each other using three elongated members such that the three elongated members form a triangular shaped structure.

12. A system for creating a feature-based coordinate reference on an object with at least a first, second, and third feature of the object, the system comprising:
    a first, second, and third feature location block configured to engage the first, second, and third feature of the object, respectively, each feature location block having a means for attachment to the object and a target placement feature configured to receive a respective target and guide placement of the respective target on the object;
    a target measuring system configured to measure locations of the targets; and
    a coordinate system configured to create a coordinate reference based on the locations of the targets.

13. The system of claim 12, wherein each target placement feature comprises a bushing.

14. The system of claim 12, wherein at least one of the targets comprises a metrology target.

15. The system of claim 12, wherein the means for attachment of the first feature location block to the object comprises a vacuum cup.

16. The system of claim 12, further comprising an elongated member with a first end and a second end, the first end connected to the first feature location block and the second end connected to the second feature location block.

17. The system of claim 16, wherein the first feature location block is rotatable with respect to the elongated member.

18. The system of claim 16, wherein the elongated member is configured to be adjustable in length along its longitudinal axis.

19. The system of claim 16, wherein the elongated member comprises a fixed length.

20. A method for syncing automation equipment to an aircraft using at least a first, second, and third feature of the aircraft, the method comprising:
    placing a first, second, and third feature location block on the first, second, and third feature of the aircraft, respectively;
    placing a first, second, and third target on the aircraft using the first, second, and third feature location block, respectively, wherein each feature location block is configured with a target placement feature for guiding placement of the respective target on the aircraft;
    measuring locations of the first, second, and third target;
    creating a coordinate reference based on the locations of the first, second, and third target; and
    syncing the automation equipment to the aircraft using the coordinate reference.

* * * * *